Feb. 1, 1944.　　　B. J. YANCHENKO　　　2,340,356
DIRECTION INDICATOR SWITCH
Filed July 23, 1941　　　2 Sheets-Sheet 1
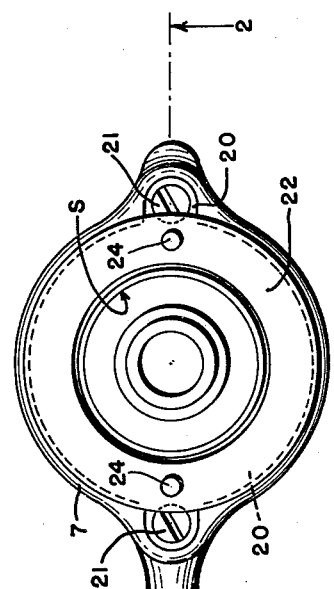
FIG. 1
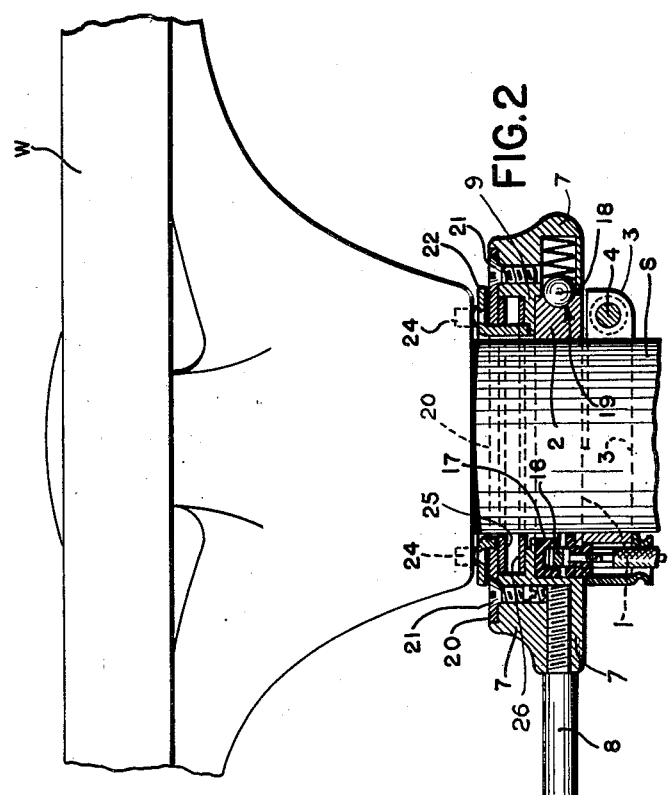
FIG. 2
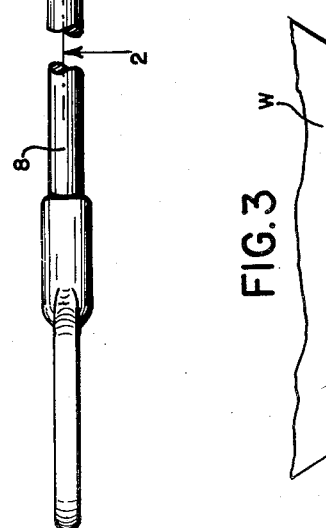
FIG. 3
INVENTOR.
BASIL J. YANCHENKO
BY Bodell & Thompson
ATTORNEYS.

Feb. 1, 1944. B. J. YANCHENKO 2,340,356
DIRECTION INDICATOR SWITCH
Filed July 23, 1941 2 Sheets-Sheet 2
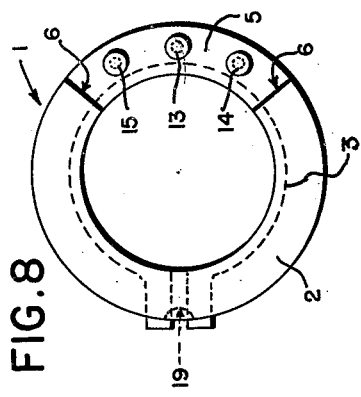
FIG.8
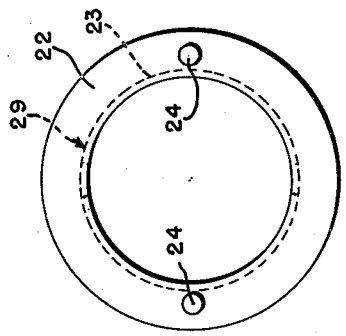
FIG.12
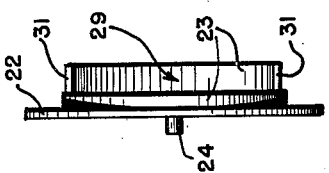
FIG.11
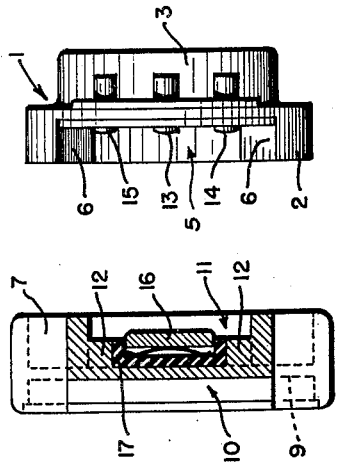
FIG.7
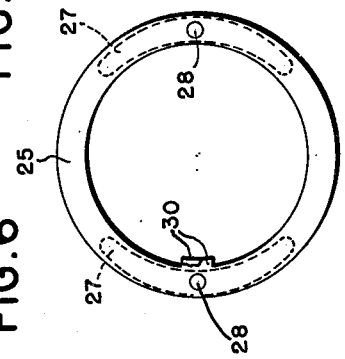
FIG.10
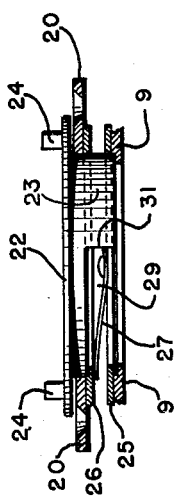
FIG.13
FIG.6
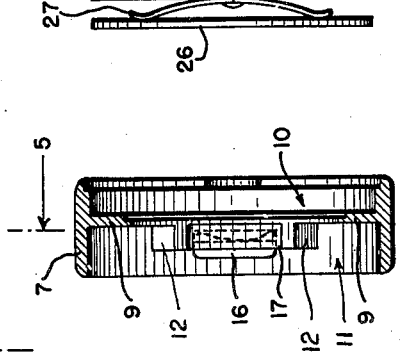
FIG.9
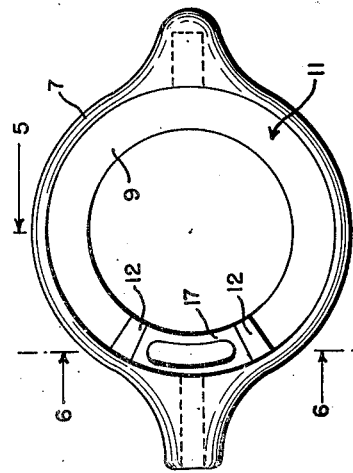
FIG.4
FIG.5
INVENTOR.
BASIL J. YANCHENKO
BY Bodell & Thompson
ATTORNEYS.

Patented Feb. 1, 1944

2,340,356

UNITED STATES PATENT OFFICE 2,340,356

DIRECTION INDICATOR SWITCH

Basil J. Yanchenko, Syracuse, N. Y., assignor to Protectall Motor Signal, Inc., Syracuse, N. Y., a corporation of Illinois Application July 23, 1941, Serial No. 403,745

6 Claims. (Cl. 200—59)

This invention relates to electric switches for direction indicators on motor vehicles, wherein the manual or lever of the switch normally sets in a central or "off" position, and when a right or left turn of the vehicle is to be made, the lever is operated by the driver in one direction or the other in accordance with the direction of the turn, and a circuit is closed through a right or left signal.

The invention has for its object the production of an automotive switch for installation upon the non-rotatable steering column of the vehicle and its steering wheel, including parts or rings operable to automatically re-set, by the turning of the steering wheel, the signal to normal or "off" position, after the turn is completed.

It further has for its object a lever re-setting means including a friction clutch device, and preferably an annular friction clutch with sufficient friction to transmit the straightening movement of the steering wheel to the switch to re-set it, together with locking means for holding the switch from operation through the clutch, upon turning of the steering wheel when the switch is in its normal or central position from which it is manually operated, preliminary to making a turn.

The invention consists in the compact arrangement of the annular elements or rings constituting the switch and its re-setting means, including the novel features and the combinations and constructions hereinafter set forth and claimed.

In describing this invention, reference is had to the accompanying drawings in which like characters designate corresponding parts in all the views.

Figure 1 is a plan view of this switch, the steering wheel being removed.

Figure 2 is a transverse diametrical sectional view taken on line 2—2, Figure 1, the contiguous portion of the steering column of a vehicle being also shown.

Figure 3 is an elevation of parts seen in Figure 2 looking to the left.

Figure 4 is a plan view of the hub of the operating lever.

Figure 5 is a sectional view on line 5—5, Figure 4.

Figure 6 is a sectional view on line 6—6, Figure 4.

Figure 7 is an elevation of the annular body or mounting ring.

Figure 8 is a top plan view of the annular body shown in Figure 7.

Figure 9 is a detail view of the friction clutch assembly.

Figure 10 is a top view of parts seen in Figure 9.

Figure 11 is an edge elevation of the driving ring.

Figure 12 is a top view of the driving ring.

Figure 13 is an elevation, partly in section, illustrating the assembly of the driving ring with the friction clutch and the contiguous portion of the hub of the operating lever.

S designates the stationary or non-rotatable tubular steering column of a motor vehicle, and W designates the steering wheel rotatably mounted on the upper end of the column. The usual steering shaft (not shown) operated by the wheel extends downwardly through the column in a well known manner.

1 designates a body or mounting ring including an upper portion 2 encircling the column S and a lower contractile or clamping integral portion 3 here shown as in the general form of a split ring, the opposite branches of which are clamped together by a clamping screw or bolt 4. The upper portion 2 is formed with an arcuate recess 5 opening through the upper edge of the body ring, the end walls 6 of this recess constituting stops for limiting the operating movement of a hand lever, as will be hereinafter described.

7 indicates a hub of the hand operating lever 8. The hub 7 encloses the upper portion 2 of the body ring 1 and is provided with an internal annular flange 9 between its upper and lower edges dividing the same into upper and lower chambers 10 and 11 or right and left chambers 10 and 11 (Figure 5). The cylindrical wall of these chambers are spaced apart from the periphery of the column S, so that these chambers are annular when assembled with the steering column.

The flange 9 is provided on the lower side thereof with spaced apart lugs 12. These lugs extend into the arcuate recess 5 of the body ring 1 and they are spaced less distance apart than the stop walls 6, the distance being sufficient to permit a right and left movement of the lever 8 to close the signal circuits by a limited movement of the hub 7 in relation to the stationary ring 2, 3.

The body ring 1 is provided with a central stationary contact 13 for connection to a feed circuit, exposed in the central portion of the segmental recess 5, and also with right and left stationary contacts 14, 15 on opposite sides of the central contact 13 also exposed in the bottom of the recess 5. These right and left contacts are connected respectively to right and left signal circuits. A spring-pressed movable conductor bridge 16 is carried by the hub 7 between the lugs 12, this being insulated from the hub at 17.

The bridge 16 is normally in contact with the central contact 13 only, and is of such segmental length as to bridge the central contact 13 and contact 14 when the lever is shifted to the right from central position, and to bridge central contact 13 and the left hand signal contact 15 when the operating lever is shifted to the left. The shifting movement in either direction is limited by one or the other of the lugs 12 engaging one or the other of the stops 6.

The hub 7 of the operating lever 8 is held normally in neutral or central position, in which the contact bridge 16 engages only with the central contact 13, by suitable means, such as a spring-pressed poppet 18, mounted in the hub 7, here shown as diametrically opposite the central contact 13 and coacting with a notch 19 in the body ring 2 located to receive the poppet only when the lever 8 is in said central position. When sufficient shifting or hand operating force is applied to the lever 8, the poppet 18 is cammed out of the socket 19.

The upper chamber 10 of the hub 7 is closed by a suitable cover plate 20 secured to the hub 7, as by screws 21.

22 designates a drive ring which couples the lever 8 to the steering wheel W through a friction clutch. This ring is shown as angular in cross-section with a cylindrical flange 23 extending into or nested in the chamber 10 of the hub 7 and extending through and acting as a bearing against the inner edge of the cover ring 20. The drive ring 22 is anchored to the hub of the wheel W in any suitable manner, as by pins 24, on the driving ring which enter suitable holes in the end of the hub of the steering wheel W, so that the drive ring rotates with the steering wheel.

The friction clutch forming part of the re-setting means for the switch lever 8 is located in the chamber 10 and connected with the drive ring 22 by a lost-motion connection of any desired form. The clutch is here shown as composed of annular friction ring plates 25 and 26 spaced apart and pressed in opposite directions by springs, as 27, interposed between them, these springs being here shown as bowed springs anchored to one of the ring plates, as at 28, with their free ends pressing against the other ring plate.

The ring plates or disks 25 and 26 are thus pressed against the flange 9 and the cover plate 20. The clutch is connected to the drive ring 22 through a lost-motion connection, and as here shown, the flange 23 of the drive ring is formed with an arcuate cut-out 29 best seen in Figures 11, 12, and each of the clutch rings 25 and 26 is formed with an inwardly extending radial lug 30 which extends into the cut-out 29. The end walls 31 of the cut-out 29 constitute shoulders or stops which engage the lugs 30 by which the driving ring 22 forcibly turns the clutch 25, 26 against the frictional drag exerted by the flange 9 and cover 20.

In operation, during normal steering without using the direction indicator by leaving the switch lever 8 in "off" or central neutral position, the friction clutch slips during turning of the steering wheel, the slippage taking place between the friction clutch rings 25, 26 and the flange 9 and the cover plate 20. The holding force of the spring-pressed poppet 18 is greater than the friction of the clutch tending to turn the hub 7 during the normal operation of the steering wheel. Assume that a right hand turn is to be made, the handle 8 is shifted or partially turned to the right, thus rocking the hub 7 to carry the contact bridge 16 into position to bridge the electrical contacts 13 and 14 closing the right hand turn signal circuit. The operating movement is limited by one of the stops or lugs 12 encountering one of the stops 6, so that turning of the steering wheel to the right, when making a turn can not further turn the operating lever. The clutch plates 25 and 26 slip during such turning, they being turned by the drive ring 22 which is turning with the steering wheel.

When the steering wheel W is straightened, after the turn is completed, one of the end walls 31 of the cut-out 29 in the flange 23 of the drive ring picks up or takes up the lost motion between it and the lugs 30 of the clutch rings 25 and 26, and thus causes the clutch to turn the hub 7 in a retrograde direction back to central position, where the spring-pressed poppet 18 holds it from further turning.

The amount of lost motion can be varied by modifying the construction of the flange 23 to alter the length of the arcuate cut-out 29 in the drive ring, so as to require rotation of the steering wheel through an arc of 90°, 180°, or even 360°, before the lost motion is taken up, when a turn of the vehicle is completed and it is coming back to straight-line travel.

What I claim is:

1. A direction indicator switch including an annular body adapted to be mounted on the non-rotatable steering wheel column of a vehicle to encircle the same, an operating lever having a hub mounted on the body to shift relatively to the same, a driving ring rotatable with the steering wheel, a friction ring clutch encircling the steering wheel column and coacting with the hub and with the driving ring and having a lost-motion driving connection with the driving ring, a central contact carried by the annular body, and right and left contacts also carried thereby on opposite sides of the central contact, a bridge carried by the hub and normally engaged only with the central contact and operable upon the shifting movement of the lever in each direction to bridge the central contact and one or the other of the other contacts, the central contact being connectable in a feed circuit and the right and left contacts to different signal circuits, impositive holding means for normally holding the hub from its shifting movement through the friction clutch with the steering wheel when the wheel is turned and the lever and its hub are set in neutral position, and stops for limiting the shifting movement of the hub out of normal central position.

2. A direction indicator switch including an annular body adapted to be mounted on and encircling the non-rotatable steering wheel column of a vehicle and including a cup-shaped portion, the peripheral wall of which is spaced from the column forming an annular chamber, an operating lever having a hub mounted on the body to shift relatively to the same and formed with an internal flange separating it into upper and lower annular chambers about the column, said flange sliding on the upper surface of the body, and the body being formed with an arcuate recess in the side wall thereof, the end walls of which recess constitute stops, a central contact for connection to a feed circuit and right and left contacts carried by the body and exposed on the bottom of the recess for connection respectively to a feed circuit and right and left signal circuits, lugs carried by said flange and extending into said recess and being spaced apart less distance than the stops to permit the shifting movement of the lever, the lugs coacting with the stops, a bridge carried by the hub between the lugs and normally engaged only with the central contact and upon a shifting movement of the lever in either direction bridging the central contact and one or the other of the other contacts, a cover plate for the chamber on the upper side of the said flange, an annular drive member for fixed connection to the rotatable steering wheel and extending into the upper chamber of the hub, a friction ring clutch located in said upper chamber encircling the steering wheel column and acting on said flange and the cover and connected to the drive member by a lost motion, to be actuated by the driving ring, and means tending to hold the hub from rotation under the turning of the drive wheel when the bridge is engaged with the central contact only and releasable by the shifting force applied to the lever.

3. A direction indicator switch for mounting on a non-rotatable steering wheel column of a vehicle, including a body ring encircling the column and fixed thereto, an operating lever having a hub encircling the body, a central contact carried by the body ring for connection to a feed circuit and right and left signal circuit contacts on opposite sides, in a circumferential direction, of the central contact, a bridge conductor carried by the hub and normally in contact only with the central contact and shiftable into engagement upon rocking of the lever in either direction from central position to bridge the central contact and one or the other of the other contacts, the body ring being provided with stops for limiting the rocking movement of the hub in either direction, a drive ring for connection to the steering wheel having a portion in nested relation to the hub, an annular friction ring clutch located in the hub and encircling the steering wheel column and frictionally engaged therewith, the friction clutch being connected to the drive ring through a lost-motion connection to be turned thereby, and means for normally holding the hub from rocking movement when the bridge is engaged with the central contact only during the turning of the steering wheel and the driving ring and releasable by operating force applied to the lever.

4. A direction indicator steering switch comprising, in combination, an annular body adapted to be installed concentrically in fixed relation on the stationary column of an automotive steering wheel, a hub having a handle swingably carried on the annular body, spaced stop means provided between the annular body and the hub to limit the manual swing of the latter, the hub having a flange resting on the body, a cover ring secured on the hub in spaced relation from said hub flange, a pair of spaced rings with spring means therebetween forming a friction clutch compressed between the cover ring and the hub flange and completely encircling the stationary column, a driving ring mounted adjacent and outside the cover, a pair of oppositely arranged pins carried by the driving ring and adapted to be permanently connected with the steering wheel when the steering switch is installed on the column by which said wheel positively rotates said driving ring, a lost-motion connection provided between the driving ring and the clutch; whereby the steering wheel automatically acts to swing the hub and handle, previously operated manually, through the limited space afforded by the stop means; electrical circuit contact means of stationary form carried by the annular body and engageable by a swingable contact carried by the hub, and a poppet-camming means operative between the stationary annular body and swingable hub to hold the latter stationary in normal position against the drag of the friction clutch when the steering wheel and driving ring are in motion and the indicator switch is not in use.

5. A direction indicator steering switch comprising, in combination, an annular body adapted to be mounted concentrically in fixed relation on the stationary column of an automotive steering wheel, a hub having a handle swingably carried on the annular body, the hub having a flange resting on the body, a cover ring secured on the hub in spaced relation from said hub flange, a pair of spaced rings with spring means therebetween forming a friction clutch compressed between the cover ring and hub flange, said friction clutch being adapted to completely encircle the stationary column of the steering wheel, a driving ring resting on the cover and encircling the steering wheel column, pin means interconnected between the driving ring and steering wheel by which said wheel positively turns said driving ring, a flange integral with the driving ring at its inside diameter, the driving-ring flange extending downwardly through the cover ring and embracing the friction clutch for relative movement therewith, the driving-ring flange having a cut-out forming a pair of circumferentially spaced shoulders, a lug integral with each friction-clutch ring at their inside diameters and in circumferential alignment with the spaced shoulders; whereby the handle and hub aforesaid may be swung from normal position to right or left for closing a signal-circuit contact means which is provided in the annular body, and whereby the steering wheel may be turned through any angular distance due to the slippage of the friction clutch, while a reverse turn of said wheel brings one of the spaced shoulders of the driving-ring flange into engagement with both lugs of said clutch by which the hub and its handle are reset to normal position by action of the steering wheel; and poppet-camming means operative between the stationary annular body and swingable hub to hold the latter in normal position against the drag of the friction clutch when the steering wheel is in motion.

6. A switch comprising, in combination, an annular body ring for encircling the steering wheel column of a vehicle and being anchored or fixed thereto, an operating lever having a hub concentric with the body ring and having a rocking movement within limits in either direction from central position, a drive ring for connection to the steering wheel to rotate therewith and having a portion nested within the annular formation of the hub, a friction clutch device operated by the movement of the drive ring to transmit motion to the hub when the steering wheel is turned, stops being provided to limit the rocking movement of the hub in either direction from central position and hence prevent its turning by the steering wheel through the friction clutch, the stops being located to permit hand operation of the lever but not movement beyond the hand operated position, and also locking means of sufficient capacity to hold the lever and hub in a central position when the steering wheel is being turned, the locking means being of sufficient capacity to overcome the friction action of the clutch when the hub or operating lever is in central position, this locking means being out of locking position when the lever is operated out of central position in one direction or the other in order that the friction clutch be free to transmit motion unless the lever is limited by the stops, the lever being limited by the stops when in one or the other, that is, its right or left operated position, but the locking means being insufficient to prevent turning of the hub and lever back to central position upon retrograde turning of the steering wheel after the turn is completed in order that the lever be returned to central position where it is locked by the locking means upon straightening of the steering wheel after a right or left turn is completed.

BASIL J. YANCHENKO.